US012367170B2

(12) United States Patent
Harriman

(10) Patent No.: US 12,367,170 B2
(45) Date of Patent: Jul. 22, 2025

(54) STREAM ROUTING AND IDE ENHANCEMENTS FOR PCIE

(71) Applicant: Intel Corporation, Santa Clara, CA (US)

(72) Inventor: David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 17/225,221

(22) Filed: Apr. 8, 2021

(65) Prior Publication Data

US 2021/0255973 A1    Aug. 19, 2021

Related U.S. Application Data

(60) Provisional application No. 63/126,964, filed on Dec. 17, 2020.

(51) Int. Cl.
| G06F 13/42 | (2006.01) |
| G06F 13/20 | (2006.01) |
| G06F 13/40 | (2006.01) |
| H04L 9/40 | (2022.01) |
| H04L 45/745 | (2022.01) |

(52) U.S. Cl.
CPC .......... *G06F 13/4295* (2013.01); *G06F 13/20* (2013.01); *G06F 13/4282* (2013.01); *H04L 45/745* (2013.01); *H04L 63/0457* (2013.01); *G06F 2213/0026* (2013.01)

(58) Field of Classification Search
CPC .................. H04L 43/0894; H04L 61/2503
See application file for complete search history.

(56) References Cited

U.S. PATENT DOCUMENTS

| 7,907,604 B2 | 3/2011 | Boyd et al. | |
| 2011/0286457 A1* | 11/2011 | Ee | H04L 61/2503 370/392 |
| 2012/0039337 A1* | 2/2012 | Jackowski | H04L 43/0894 370/392 |
| 2013/0016726 A1* | 1/2013 | Numakura | G11C 8/16 370/394 |
| 2013/0232279 A1* | 9/2013 | Adar | G06F 9/30145 710/3 |
| 2014/0115223 A1 | 4/2014 | Guddeti et al. | |

(Continued)

OTHER PUBLICATIONS

Netherlands Patent Office, Office Action dated Mar. 27, 2023 in Netherlands Patent Application No. 2029742 (11 pages).

(Continued)

*Primary Examiner* — Getente A Yimer
(74) *Attorney, Agent, or Firm* — Eversheds Sutherland (US) LLP

(57) ABSTRACT

Embodiments described herein may be directed to apparatus, systems, techniques, or processes for a routing mechanism based on the Stream ID field, already present in IDE TLPs, applicable to switches, root complexes (RC) and multifunction devices. This in turn allows additional header content for IDE TLPs to be encrypted instead of being sent in the clear (not encrypted). Additionally, Stream routing may be used for non-IDE TLPs as well by allowing the inclusion and application of the Stream mechanism to non-IDE TLPs. Other embodiments may be described and/or claimed.

17 Claims, 11 Drawing Sheets

(56) References Cited

U.S. PATENT DOCUMENTS

| | | | |
|---|---|---|---|
| 2014/0237156 A1* | 8/2014 | Regula | G06F 13/4022 |
| | | | 710/314 |
| 2014/0304505 A1* | 10/2014 | Dawson | G06F 21/6227 |
| | | | 713/165 |
| 2014/0372641 A1* | 12/2014 | Hearn | G06F 13/4022 |
| | | | 710/104 |
| 2014/0372660 A1* | 12/2014 | Jones | G06F 13/4022 |
| | | | 710/316 |
| 2018/0101498 A1 | 4/2018 | Cosby et al. | |
| 2019/0305797 A1 | 10/2019 | Peffers et al. | |
| 2019/0306134 A1 | 10/2019 | Shanbhogue et al. | |
| 2019/0384733 A1 | 12/2019 | Jen et al. | |
| 2020/0151362 A1 | 5/2020 | Harriman et al. | |
| 2020/0226091 A1 | 7/2020 | Harriman | |
| 2021/0089388 A1 | 3/2021 | Makaram et al. | |
| 2021/0255973 A1 | 8/2021 | Harriman | |

OTHER PUBLICATIONS

Peripheral Component Interconnect Special Interest Group, Peripheral Component Interconnect Special Interest Group, 3855 SW 153rd Drive, Beaverton, OR, Nov. 19, 2020 (XP040726432).

Intel Corporation, "Compute Express Link, Specification, Mar. 2019, Revision 1.0," Mar. 2019, 206 pages.

International Search Report and Written Opinion received for PCT Patent Application No. PCT/US2021/050773, mailed on Jan. 7, 2022, 11 pages.

* cited by examiner

Request Header Format for 64-bit Addressing of Memory

FLIT Mode Mem64 Request

FIG. 7 Configuration Space Header

STREAM ROUTING AND IDE ENHANCEMENTS FOR PCIE

This application claims priority to U.S. Provisional Patent Application No. 63/126,964, filed on Dec. 17, 2020, in the name of David J. HARRIMAN, entitled "STREAM ROUTING AND IDE ENHANCEMENTS FOR PCIE," the disclosure of which is hereby incorporated by reference.

TECHNICAL FIELD

Embodiments of the present disclosure generally relate to computer interconnects, and in particular stream routing for peripheral component interconnect express (PCIe) architecture.

BACKGROUND

PCIe architecture has provided data transmission rate improvements that have been key to expanding the number of components that may be implemented within computing systems, and increasing the overall performance of the computing systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 7 shows an implementation of PCI routing mechanism using range registers to define addresses and ID regions for TLP routing.

DETAILED DESCRIPTION

Figure 1:
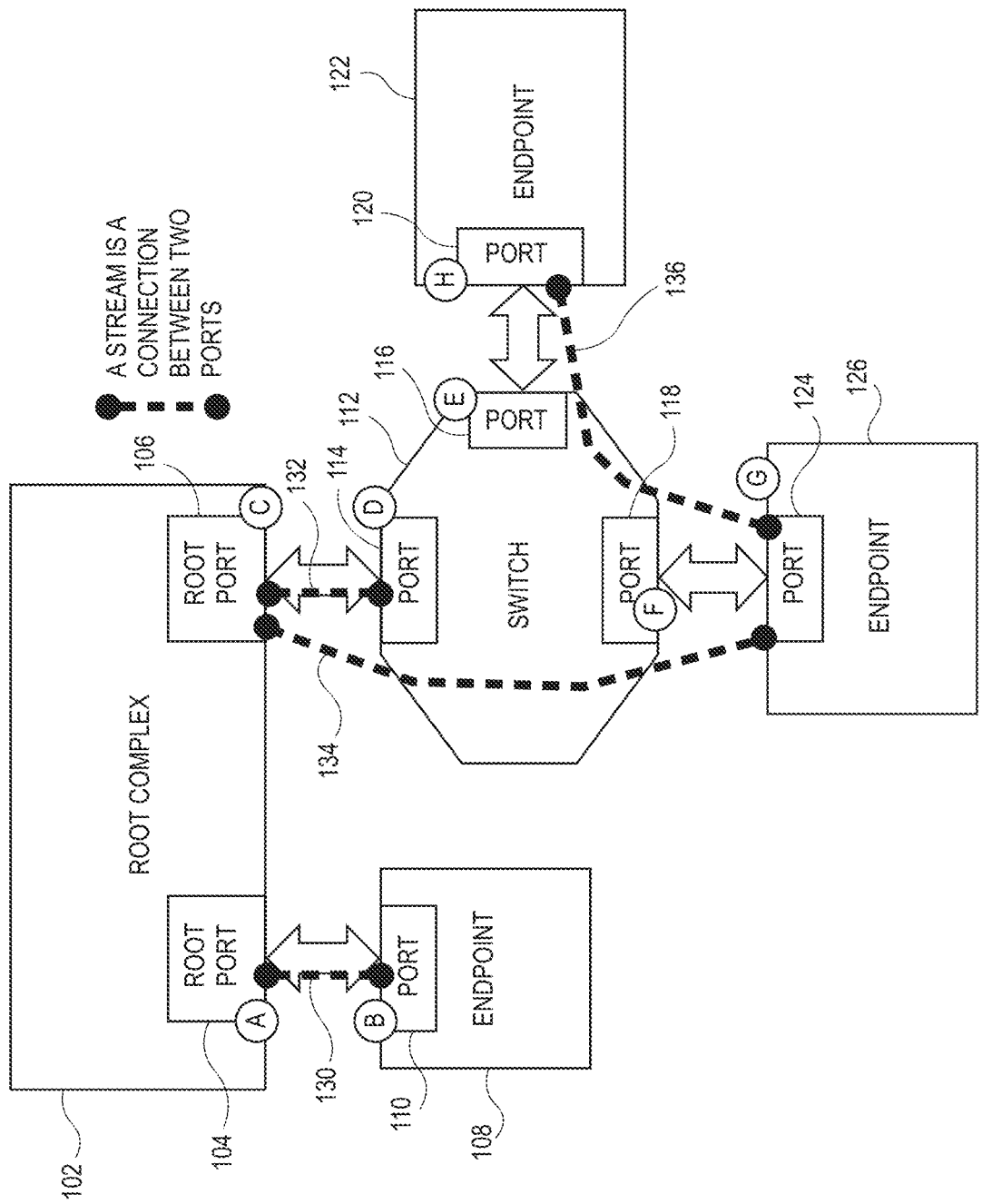
FIG. 1 is an architectural diagram of a portion of a PCIe environment that shows a stream connection between ports of the environment.

Embodiments described herein may include apparatus, systems, techniques, or processes directed to a routing mechanism based on a Stream ID field, already present in Integrity and Data Encryption (IDE) transaction layer packets (TLPs), applicable to switches, root complexes (RC) and multifunction devices. This in turn allows additional header content for IDE TLPs to be encrypted instead of being sent in the clear (not encrypted). Additionally, Stream routing may be used for non-IDE TLPs as well by allowing the inclusion and application of the Stream mechanism to non-IDE TLPs.

Embodiments described herein may improve security of TLP traffic, improve robustness of systems, and simpler composition and management of peer-to-peer connections. Embodiments may be included in a PCIe base specification (or any changes, modifications, or future versions thereof) and so would be part of future PCIe products.

PCI uses a distributed decode architecture, meaning that the source of a TLP does not know the destination, and the TLP is routed step-by-step with additional decoding/steering done at each step. Although there are advantages to this architecture, it is problematic when a "contract" is required between a source and destination, as with IDE, which applies Advanced Encryption Standard-Galois Counter Mode (AES-GCM) authenticated encryption to TLPs, but implements a pairwise relationship between the source and destination. In PCIe IDE today, there is a notion of a "Stream" which is applied to describe this connection between two ports, effectively placing all the burden of source decode on the source of an IDE TLP, but the actual TLP routing still uses distributed decode, meaning the TLP addressing information may be sent in the clear (unencrypted), and the association between a Stream and the routing mechanisms is implicit, limiting Stream-based optimization. This is also "fragile" in the sense that any misconfiguration of the system that affects TLP routing can result in the failure of the pairwise contract between two ports, resulting in an error indistinguishable from a security attack and in turn typically causing a hard failure for the secure workload.

Embodiments described herein "turn around" the Stream concept and define a routing mechanism for TLPs based on the Stream, where a Stream is defined as a logical connection between two ports. This addresses the "fragility" problem mentioned above by giving Stream Routing precedence above the existing PCIe TLP routing mechanisms, and it enables parts of the TLP header, including the address, that are currently sent in the clear to instead be encrypted, which significantly improves security against certain kinds of "side channel" attacks. In addition, Stream routing can be applied when IDE is not in use, proving a simpler and easier to manage routing architecture, especially for using peer-to-peer communication between devices. Additionally, some mechanisms such as the Max Payload Size mechanism require a similar "contract" as with IDE, and in turn benefit from the Stream routing mechanism by ensuring that only devices using compatible settings (e.g. matching Max Payload Size) communicate with each other. Stream Routing is used in addition to the existing routing mechanisms so that older devices or newer devices using TLP traffic for which a Stream association is undesirable continue to work using the existing routing architecture.

Additional information related to Integrity and Data Encryption (IDE) may be found in the PCI-SIG Engineering Change Notice titled "Integrity and Data Encryption (IDE)."

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. For the purposes of the present disclosure, the phrase "A and/or B" means (A), or (A and B). For the purposes of the present disclosure, the phrase "A, B, and/or C" means (A), (B), (C), (A and B), (A and C), (Band C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is an architectural diagram of a portion of a PCIe environment that shows a stream connection between ports of the environment. FIG. 1 shows a root complex (RC) 102 that includes a root port A 104 and a root port C 106. A first endpoint 108 may include a root port B 110 that is coupled with root port A 104. A switch 112 may include a first port D 114, which may be coupled with a root port C 106, a second port E 116 that may be coupled with port H 120 of endpoint 122, and a third port F 118 that may be coupled with port G 124 of endpoint 126.

Multiple streams, each of which may be a connection between two ports, may be found in FIG. 1. For example, stream 130, may connect root port A 104 with port B 110. Stream 132 may connect the root port C 106 with port D 114. Stream 134 may connect root port C 106 with port 124 of endpoint 126 via switch 112. Stream 136 may connect port H 120 with port G 124 via switch 112. In legacy implementations, ID selective streams may include connections that can be established between any two ports.

In the embodiment of FIG. 1, each of root complex 102, and endpoints 108, 122 and 126 may include various circuitry such as cores or other processing units that may generate and process information and provide at least some of this information for communication via interface circuitry. Such interface circuitry may include a transaction layer, a link layer and a physical layer that process the information into packets, e.g., into TLPs for communication according to a given PCIe protocol, providing mechanisms for stream-based routing as described herein.

A variety of mechanisms can be used to associate a TLP with a specific stream, per the section of the IDE specification quoted here:

--- o When a Selective IDE Stream is enabled, in order to associate a TLP with a specific Selective IDE Stream, the Transmitting Port must follow these rules:
  the TLP type must be permitted for Selective IDE Streams (see Table
  ,and,
  the TC of the TLP must match the TC value in the Selective IDE Stream
  Control Register, and,
  for ID-Routed Messages and, ifthe Selective IDE for Configuration
  Requests Enable bit is Set, Configuration Requests,
    ☐ the destination RID is greater than or equal to the RID Base and
    less than or equal to the RID Limit in the Selective IDE RID
    Association Register block, unless there is an exception made via
    implementation-specific means
  for Memory Requests,
    ☐ the destination address greater than or equal to the Memory
    Base value and less than or equal to Memory Limit value in a
    Selective IDE Address Association Register block (as applies
    when targeting a specific Function's BAR or the Base/Limit range
    of addresses assigned to a Device), unless there is an exception
    made via implementation-specific means for Completions, the
    following must match the values indicated in the corresponding
    Non-Posted Request:

☐ Stream ID
☐ Tbit
or, if the Default Stream bit is Set, and, per the rules above, the TLP is
not associated with any other Stream associated with the TC
or through implementation-specific means.
   ☐ e.g., the Transmitter could associate all Memory Requests
   initiated by a particular internal Function(s) with a specific
   Selective IDE Stream, particularly when it is known that the
   Partner Port is a Root Port, and that all Requests initiated by that
   internal Function target system memory.

Figure 2:
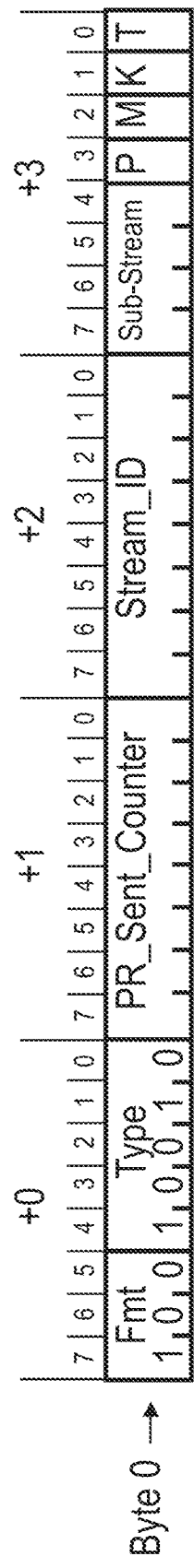
FIG. 2 is an example of an indication of an associated stream within a field of a transaction layer packet (TLP) included in the integrity and data encryption (IDE) TLP prefix for non-FLIT mode operation prior to PCIe version 6.0.

FIG. 2 is an example of an indication of an associated stream within a field of a transaction layer packet (TLP) included in the integrity and data encryption (IDE) TLP prefix for non-FLIT mode operation prior to PCIe version 6.0. In embodiments, Fmt is the Format field. The Fmt and Type fields together define what the thing, in this case a TLP Prefix, may be. The PR_Sent_Counter is a count of Posted Requests. In embodiments, P if 1 indicates a checksum (PCRC) is present; M if 1 indicates a Message Authentication Code (MAC) is present; K indicates which key set (0 or 1) to use; and T if 1 indicates the TLP originated from within a trusted execution environment.

Figure 3:
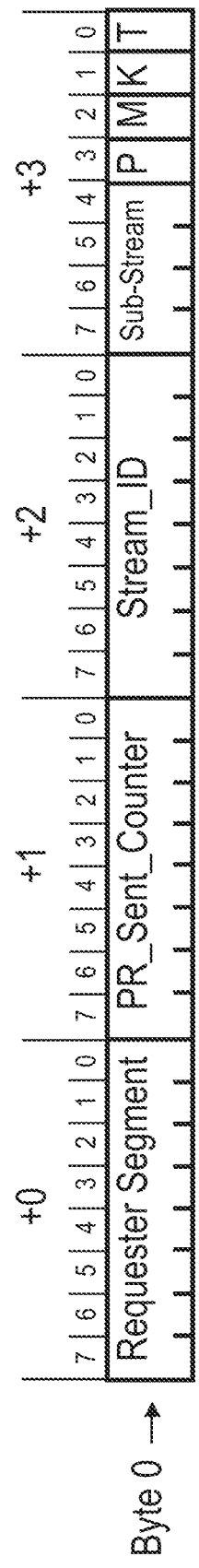
FIG. 3 is an example of an indication of an associated stream within a field of a TLP included in the orthogonal header content (OHC-C) for FLIT mode operation.

FIG. 3 is an example of an indication of an associated stream within a field of a TLP included in the orthogonal header content (OHC-C) for FLIT mode operation. This OHC-C includes a requester segment field, in addition to the fields discussed above regarding the TLP prefix of FIG. 2. Note that in embodiments this content may be considered part of a header (and understand that prefixes may also be considered part of a header).

Figure 4:
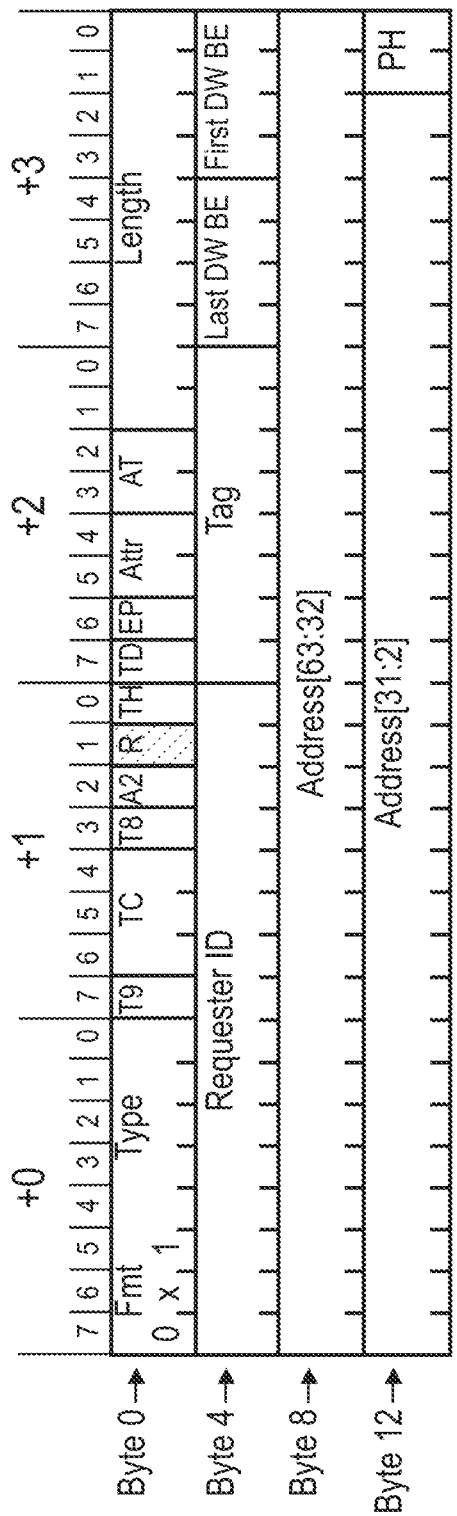
FIG. 4 is a request header format for 64-bit addressing of memory sent unencrypted in non-FLIT mode.

FIG. 4 is a request header format for 64-bit addressing of memory sent unencrypted in non-FLIT mode. In PCIe IDE of today, the Stream_ID is carried with the TLP, but TLP routing for Selective IDE is done using the existing Address and ID routing mechanisms, which means that these fields may be unencrypted (in the clear), and with IDE today the entire TLP header is sent in the clear. FIG. 4 shows a Memory Request header, without the prefix, in Non-FLIT Mode.

Figure 5:
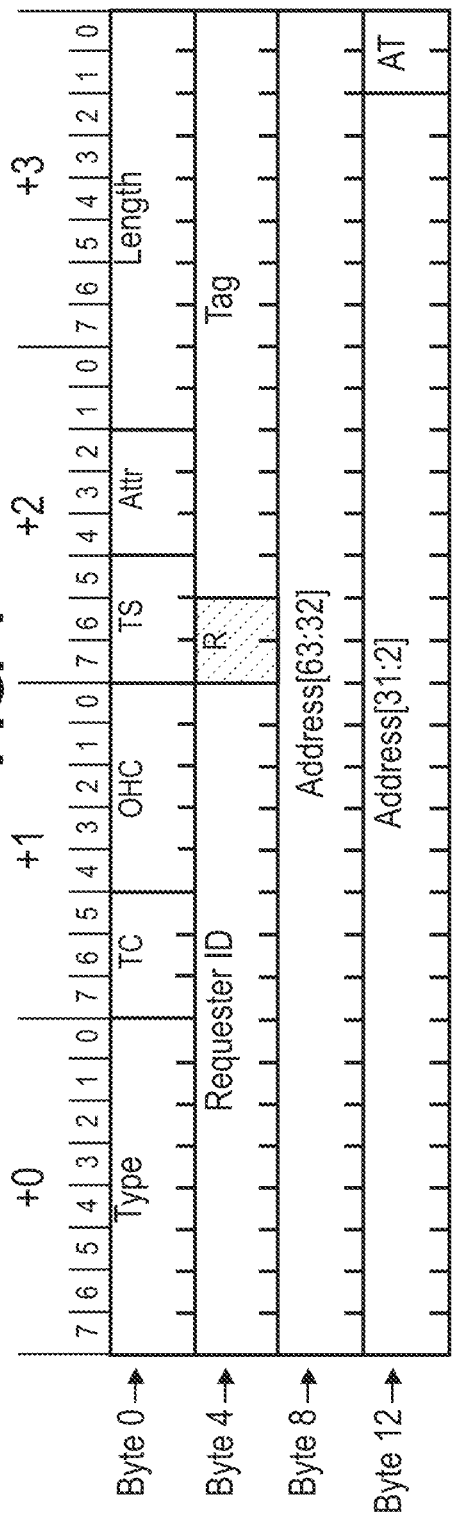
FIG. 5 is a FLIT mode 64 bit memory request.

FIG. 5 is a FLIT mode 64 bit memory request. FIG. 5 shows a memory request header without the OHC-C, in FLIT mode.

Figure 6A:
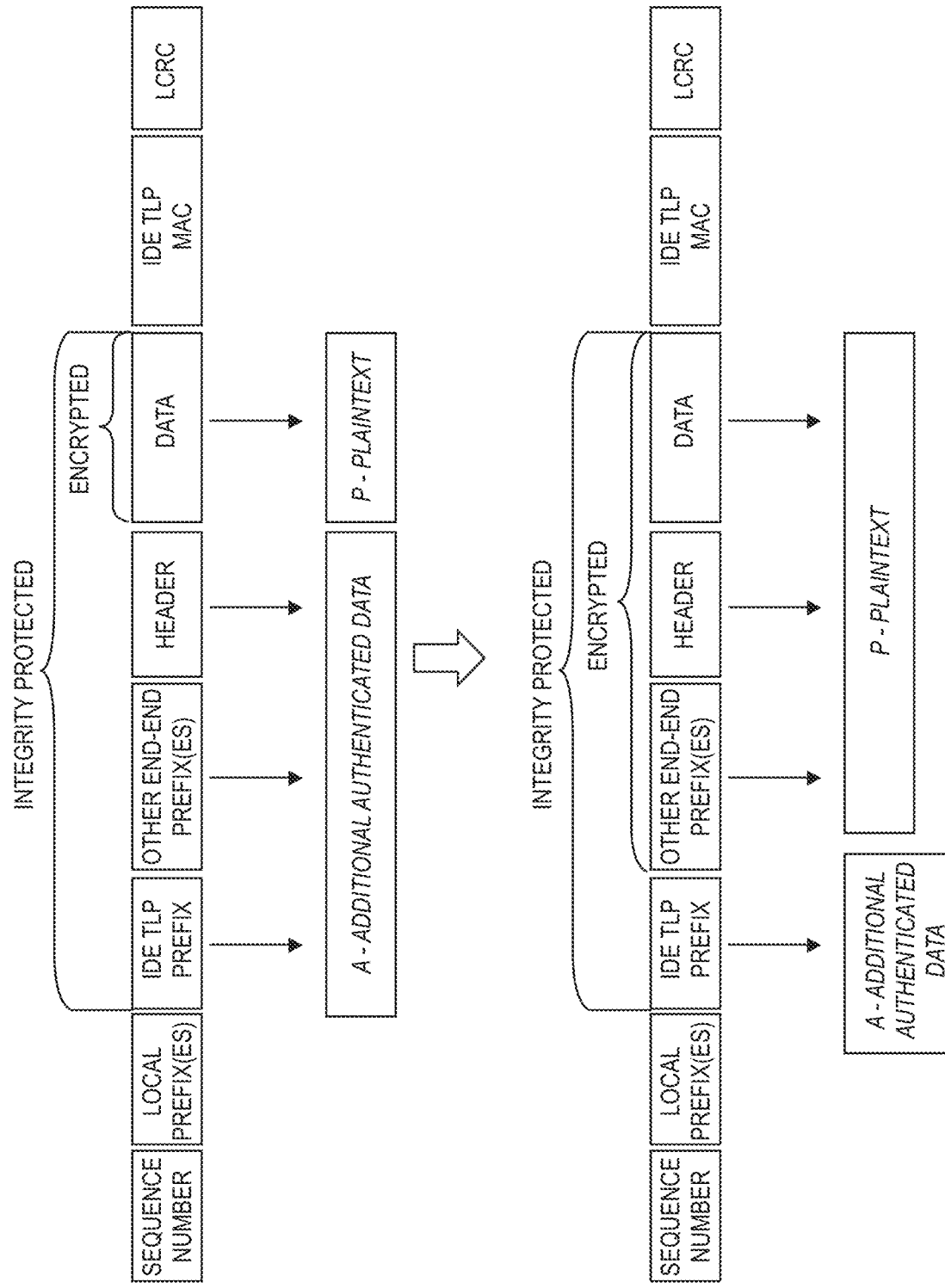
FIG. 6A shows an implementation of stream-based routing, where prefixes, OHC, and the header is encrypted, along with data payload, in accordance with various embodiments.

FIG. 6A shows an implementation of stream-based routing, where prefixes, OHC, and the header is encrypted, along with data payload, in accordance with various embodiments. As shown at the top portion of FIG. 6A, without stream-based routing in accordance with an embodiment only a data payload itself is encrypted. While other portions of a TLP, namely an IDE TLP prefix, other end-to-end prefixes and header, also may be integrity protected, e.g., by way of a cyclic redundancy checksum (CRC), the data payload remains as the only encrypted portion. Still further as shown in FIG. 6A without an embodiment, a link layer communicates a TLP that includes a sequence number, one or more local prefixes, the integrity protected portion, an IDE TLP MAC and a link CRC field (LCRC).

As shown at the bottom portion of FIG. 6A instead with an embodiment implementing stream-based routing additional information, including other end-to-end prefixes, and header (among potentially other fields) may further be encrypted along with data which results in greater security, while still enabling routing using a TLP prefix (or OHC-C) that is unencrypted. By enabling Stream-based routing, the requirement to expose routing information in the clear other than the Stream ID field is eliminated. The Sub-Stream may also remain in the clear to enable flow control accounting to be done without TLP decryption, and so, in embodiments, for simplicity the TLP Prefix (non-FLIT Mode)/OHC-C content (FLIT Mode) may continue to be entirely in the clear. However, all other prefixes/OHC and the header itself (illustrated in the figures) is now encrypted (along with any data payload).

Figure 6B:
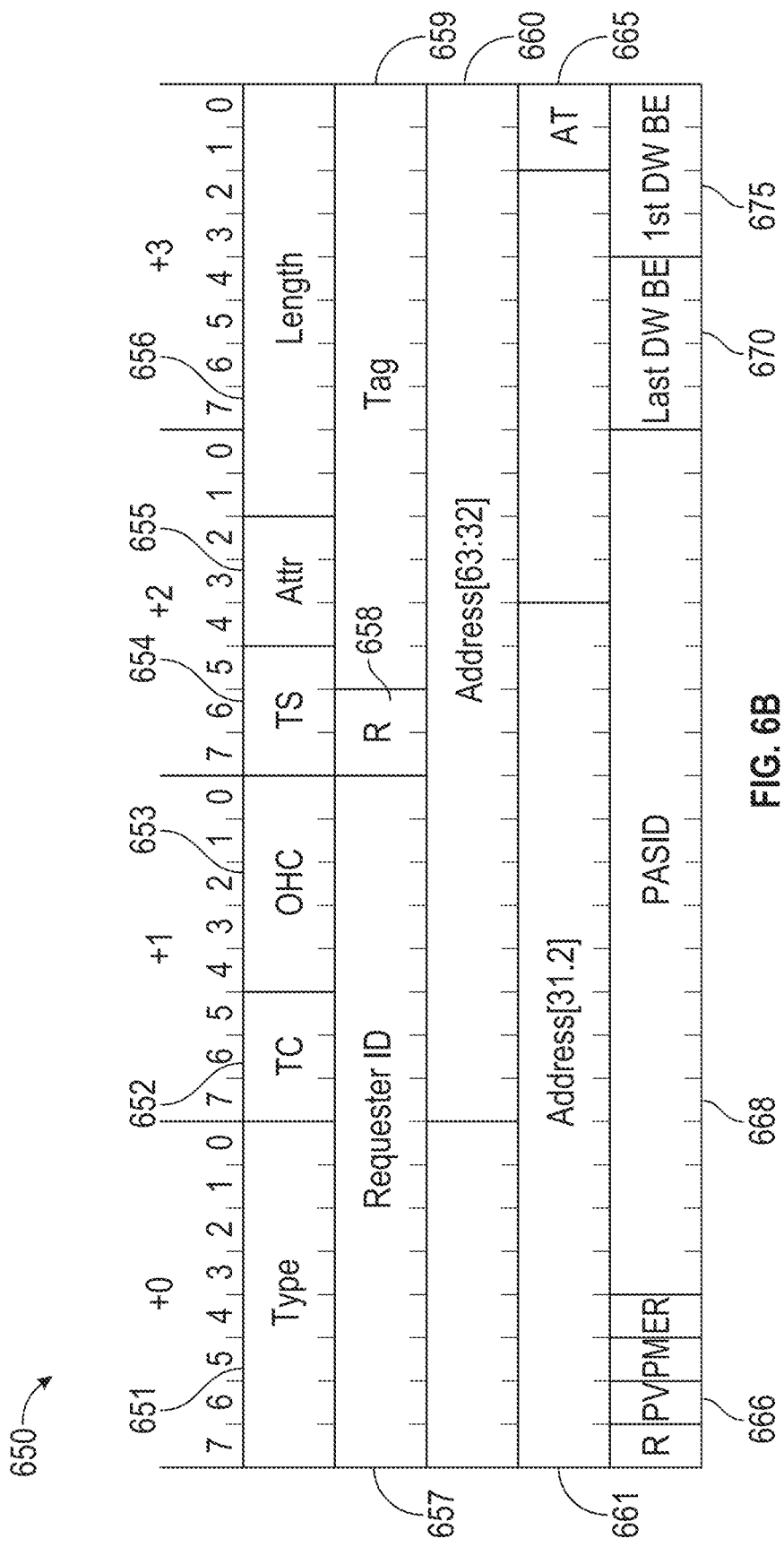
FIG. 6B shows an implementation of a header with selective encryption in accordance with an embodiment.

In alternate embodiments, some portions of the header and/or prefixes and/or other fields may be encrypted while other portions are not encrypted, so that the portions used for TLP routing are not encrypted, allowing the use of legacy PCIe routing mechanisms based on addresses/IDs. As shown in FIG. 6B, some header fields used for routing such as address fields may be at least partly unencrypted, so that the portion of a field that is used for routing remains in the clear, and the portion of a field that is not used for routing is encrypted. In an embodiment, the demarcation between the encrypted and unencrypted portions of such routing fields may be programmable, for example using a configuration mechanism for the communicating ports.

In an embodiment, certain fields, such as byte enables, when present, may be encrypted, while other fields, such as the Type, traffic class (TC), OHC, Trailer Size (TS) and Length fields are not encrypted. In turn other fields such as the Requester ID, TAG and address type (AT) fields, may be selected for encryption, for example by using a configuration mechanism for the communicating ports. This selective encryption approach may enable continued use of existing routing mechanisms, while leaving the unencrypted parts of the TLP exposed.

Thus as illustrated in FIG. 6B, a header 650 includes various information. In the embodiment shown, a TYPE field 651, TC field 652, OHC field 653, TS field 654, and length field 656 may be unencrypted. In turn, an attribute field 655, Requester ID field 657, Reserved (R) fields (including 658), Tag field 659, (at least) portions of address fields 660, 661 and process address space ID (PASID) field 668, AT field 665, and field 666 (including R information, a PASID Valid (PV) value that is a qualifier for the value in PASID field 668, a Privileged Mode Requested (PMR) value and an Execute Requested (ER) value) may be programmable to be encrypted or unencrypted (or combinations). In an embodiment, Byte Enable (BE) fields 670, 675 for each byte of a DW in the data payload may be encrypted, where first DW BE field 675 has byte enables for the first DW and last DW BE field 670 has byte enables for the Last DW (and where all bytes in between the first and the last DWs are implicitly enabled).

Note that in some embodiments there need not be a strict demarcation between encrypted/unencrypted on a per field basis. For example, an address field can have discontinuous ranges of bits encrypted and unencrypted. In a particular example, address bits 63:60 and 55:20 can be sent in the clear, while address bits 59:56 and 19:0 are encrypted.

Figure 7:
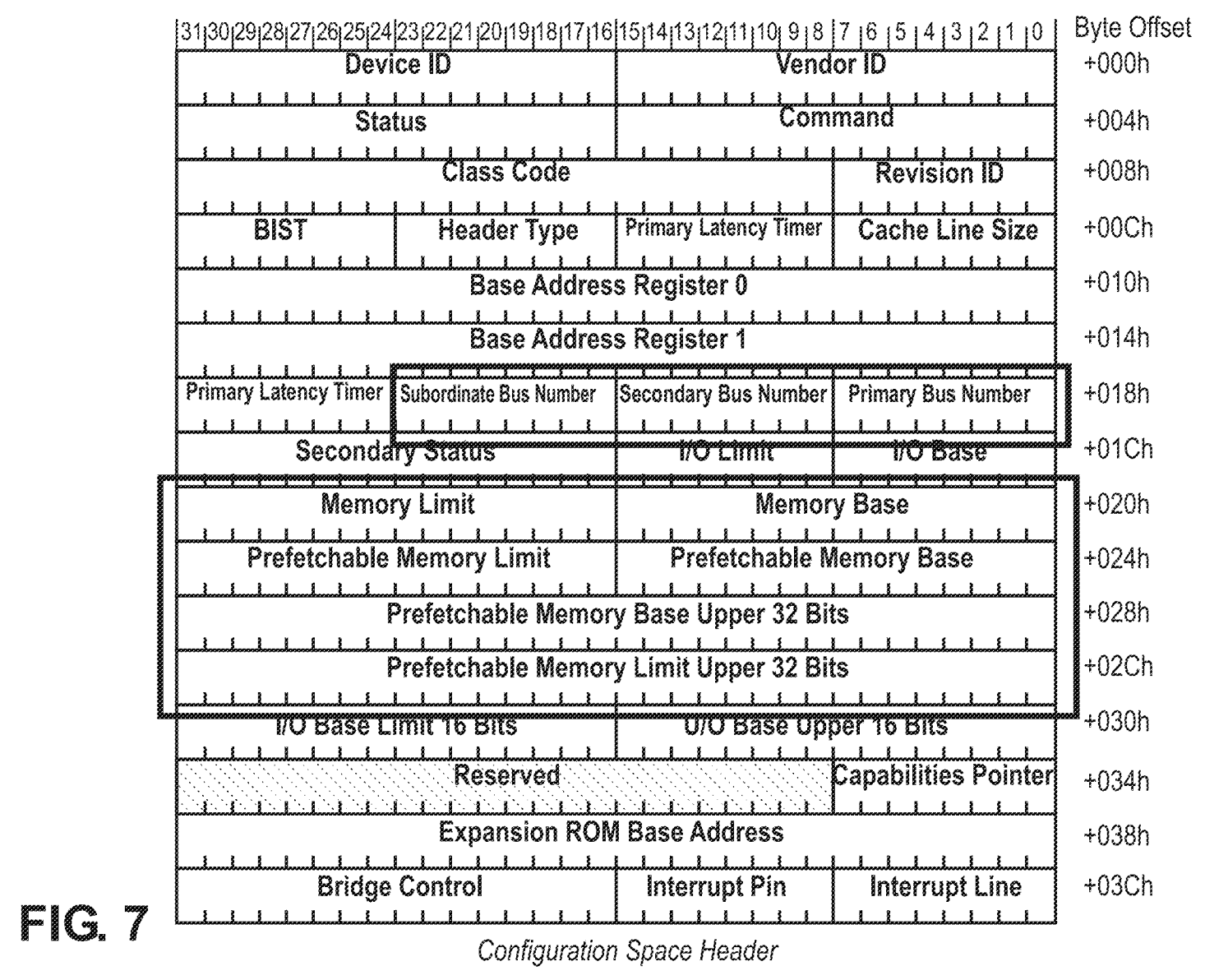

FIG. 7 shows an implementation of PCI routing mechanism using range registers to define addresses and ID regions for TLP routing. The change in IDE TLP processing will be indicated via a new pair of capability and control bits in the IDE Extended Capability structure (not illustrated). IDE optionally supports TLP Aggregation to improve bandwidth efficiency (not illustrated here). Aggregation support is not affected by this change. Legacy PCI routing mechanisms uses range registers to define address and ID regions (highlighted in FIG. 7) applied for TLP routing in each logical Bridge structure at each Root Port and Switch Port.

These ranges apply to memory read and write requests and ID routed requests such as configuration requests and messages. The same mechanism is used for IO Routed Requests also, and embodiments could be applied to those as well, but these are mostly deprecated in modern systems. There is a mechanism in the PCIe specification for memory and ID routing called Flattening Portal Bridge that is also considered part of the "older" distributed decode architecture in relation to Stream Routing as discussed and defined here.

In embodiments, the existing routing mechanisms continue to apply as-is for TLPs that are not associated with a Stream, but a new Stream-based routing mechanism is defined and used instead of the existing mechanisms for TLPs that are associated with a Stream for which a routing entry has been created. The Stream-based mechanism takes precedence over the existing mechanism, so if there is a conflict between the two, enabling, for example, the use of the Stream mechanism to distinguish unique address spaces, for example differing Guest Physical Address spaces for two different Virtual Machines.

The routing configuration for a Switch or Root Complex (RC) can be done in multiple ways-in an industry spec most likely only one mechanism will be specified, but one or more (or variations) could be used.

There may be advantages to doing routing configuration centrally vs. at each Switch or Root Port. So, embodiments may use a register mechanism that would be associated with the Upstream Port of a Switch, or with a single Function or Root Complex Register Block in a Root Complex, that defines the routing for all Streams and all Ports of the Switch/RC. This could be done using a table with an entry for each stream number (the table may contain 256 entries because the Stream_ID field is 8 bits), as shown in Table 1 below:

TABLE 1

| Table Index = Stream Number | PortX | PortY | Comment (not part of the data structure) |
| --- | --- | --- | --- |
| 0 | 5 | 7 | Stream 0 operates bidirectionally between Ports 5 and 7 |
| 1 | 5 | 2 | Stream 1 operates bidirectionally between Ports 5 and 2 |
| 2 | — | — | Stream 2 is not assigned |
| 3 | 1 | 9 | Stream 3 operates bidirectionally between Ports 1 and 9 |
| ... | | | |
| 255 | | | |

Or a smaller table (in this example, 4 entries) could be used where the Stream Number is programmable and entries need not be in any particular order, as shown in Table 2:

TABLE 2

| Stream Number (programmable) | PortX | PortY | Comment (not part of the data structure) |
| --- | --- | --- | --- |
| 0 | 5 | 7 | Stream 0 operates bidirectionally between Ports 5 and 7 |
| 3 | 1 | 9 | Stream 3 operates bidirectionally between Ports 1 and 9 |
| 1 | 5 | 2 | Stream 1 operates bidirectionally between Ports 5 and 2 |
| — | — | — | This entry is unassigned |

Alternately, Stream-based routing could use a new Extended Capability Structure implemented in each Port, where a bit-vector could be used to indicate that the Port can be the ingress or egress Port for a particular stream as shown in Table 3:

TABLE 3

| Table Index = Stream Number | Entry Value | Comment (not part of the data structure) |
| --- | --- | --- |
| 0 | 1 | Stream 0 passes through this Port |
| 1 | 1 | Stream 1 passes through this Port |
| 2 | 0 | Stream 2 does not pass through this Port |
| 3 | 1 | Stream 3 passes through this Port |
| ... | | |
| 255 | 0 | Stream 255 does not pass through this Port |

Or the Per-Port structure could use a programmable Stream field with a limited number of entries as shown in Table 4:

TABLE 4

| Stream Number (Programmable) | Entry Valid? | Comment (not part of the data structure) |
| --- | --- | --- |
| 0 | 1 | Stream O passes through this Port |
| 9 | 1 | Stream 9 passes through this Port |
| <value does not matter> | 0 | This entry is unused |
| 3 | 1 | Stream 3 passes through this Port |

In the above, there may be a Port Numbering system understood by the system software. This can be established in many ways, but one such way is to use the Port Index numbering mechanism defined in the IDE Key Management protocol per this quote from the IDE specification:

For a Switch that supports the IDE_KM responder role:

The Switch Upstream Port must implement the responder role for itself and the Upstream Port must respond to a Port Index of 00h.

Downstream Ports of the Switch that are represented by the Upstream Port must respond to Port Index ranging from 01h to FFh, where the order is established by the Device/Function numbers assigned by the Switch construction to the Downstream Ports from lowest to highest.

It is permitted for a Switch to implement a responder capability in a Downstream Port, for example by implementing a DOE instance in the Downstream Port, in which case that Downstream Port must respond to a Port Index of 00h.

It is permitted for that Port to represent other Downstream Ports, in which case the represented Downstream Ports must respond to Port Index ranging from 01h to FFh, where the order is established by the Device/Function numbers assigned by the Switch construction to the Downstream Ports from lowest to highest.

For a Root Port that supports the IDE_KM Responder role:

The Root Port must implement the responder role for itself and must respond to a Port Index of 00h.

It is permitted for that Port to represent other Root Ports, in which case the represented Root Ports must respond to Port Index ranging from 01h to FFh, where the order is established by the Device/Function numbers assigned by the Root Complex construction to the Root Ports from lowest to highest.

Using the IDE Key Management Port numbering mechanism is advantageous in cases where Stream Routing is used with IDE because it simplifies configuration software and reduces the possibility for error, and is also advantageous because this naming system also enables the "centralized" routing mechanisms defined above to be implemented more than once, as may be desirable for example in a Root Complex having of multiple components (e.g., CPUs, PCHs), so that each component of the Root Complex implements its own routing interface independent of the other components.

System software will program this mechanism after the system has booted and at least the high-level data flows within the system are established, similarly to the flow for IDE configuration, where it is assumed that at least an understanding of which components directly communicate has been established. Typically, the communication flows are between a device and the host, and so a beneficial effect of formalizing that relationship using Stream Routing is that then unintended peer-to-peer accesses between devices are more readily identified and blocked/flagged as errors. As with all aspects of system resource routing configuration, it is generally undesirable to reconfigure Stream Routing while there is ongoing traffic within the system, and so generally at least the affected Streams can be made quiescent before modifying Stream Routing or de-establishing a Stream.

Traffic using different Streams will generally, but not always, be unrelated to traffic using other Streams, and so for performance optimization it is desirable to allow these cases to be distinguished so that the usual PCIe ordering rules may be relaxed. The ID Ordering (IDO) mechanism that already exists in PCIe can be readily adapted for this purpose, along with the bit within the TLP header that indicates IDO, or an alternate mechanism may be used. As noted, in most cases the desirable behavior will be to set this ordering attribute by default for all TLPs using Stream Routing, but in some cases such as when three agents are communicating (e.g. two devices and the host processor) then ordering between different Streams may be desirable, and so there should be a mechanism to indicate it, along with an implementation-specific way to identify specific TLPs for which the ordering requirement may be indicated.

In one embodiment, the check for a defined routing entry is done at each routing element (Switch or Root Complex) and, although typically a Stream routing would be defined end-to-end, it is permitted for some routing elements to apply Stream routing and others to use the existing routing mechanisms for a given TLP as it travels from source to destination through multiple routing elements.

Figure 8:
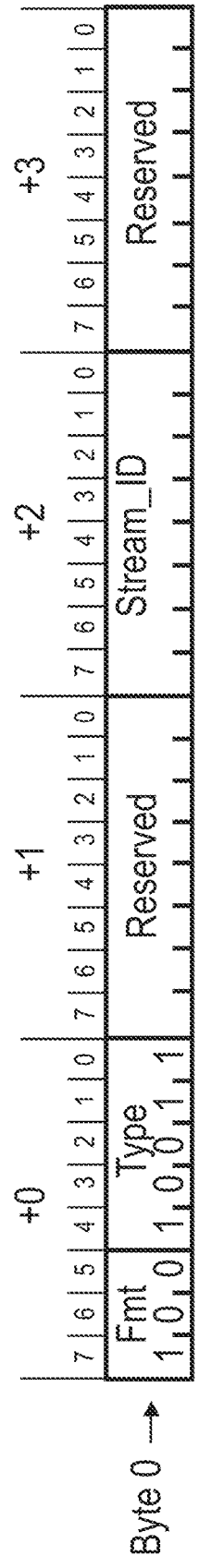
FIG. 8 shows a new TLP prefix for non-FLIT mode, in accordance with various embodiments.

FIG. 8 shows a new TLP prefix for non-FLIT mode, in accordance with various embodiments. To enable the use of Stream routing with non-IDE TLPs, rules for applying a Stream ID to a TLP are provided to allow Stream ID use (for TLP routing, as defined above) with non-IDE TLPs, and to distinguish between IDE and non-IDE TLPs when this is done. A new TLP prefix may be defined for Non-FLIT Mode (distinguished by the "10011" value in the Type field). Note also that this TLP prefix a format does not include a PR_Sent_Counter field, sub-stream information or metadata including the P, M, K and T bits discussed above in FIGS. 2 and 3.

Figure 9:
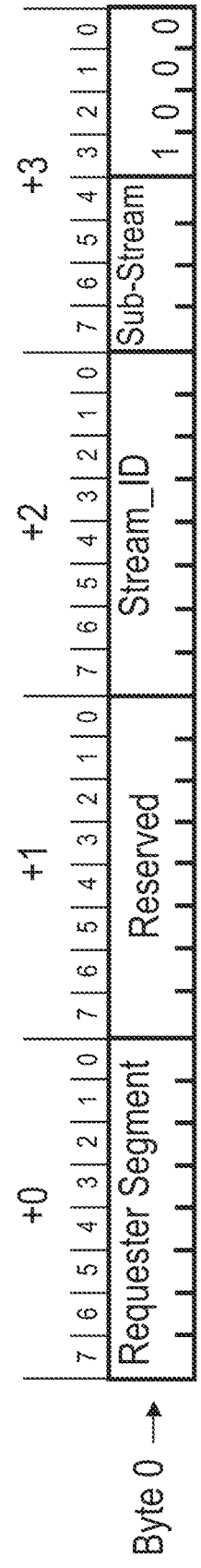
FIG. 9 shows a new encoding of a OHC-C for FLIT mode, in accordance with various embodiments.

FIG. 9 shows a new encoding of a OHC-C for FLIT mode, in accordance with various embodiments. FIG. 9 shows a new encoding the OHC-C for FLIT mode, that can be readily distinguished from the existing OHC-C definition because the "1000" value in bits 3:0 of Byte 3 is not presently allowed—Today, the P bit (bit 3) may only be Set if the M bit (bit 2) is also set—the values in bits 1 and 0 are not important but may be 00 so as to preserve other encodings for potential future uses. Note that this OHC-C format similarly does not include a PR_Sent_Counter field.

Figure 10:
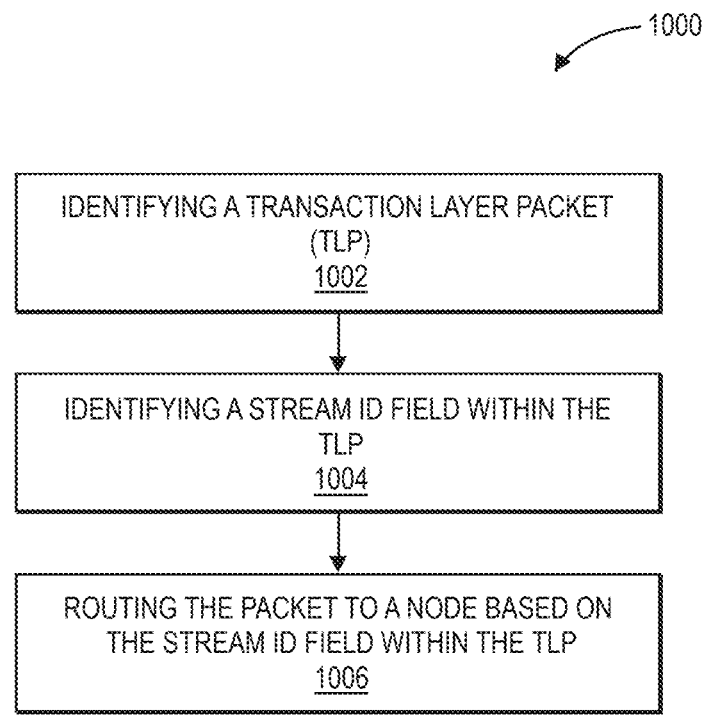
FIG. 10 is a process for implementing stream routing, in accordance with various embodiments.

While shown with these particular formats in FIGS. 9 and 10, understand that embodiments are not limited to these examples, and other formats are possible. For example, it is possible to separate the Stream ID into a different prefix/OHC, e.g., so that Stream routing would use one OHC (e.g., OHC-X), and the PMKT/PR_Sent_Counter information would be in another OHC (e.g., OHC-Y). Also formats can differ between Stream routing without IDE (which may include just OHC-X), and Stream routing with IDE (which may include both OHC-X and OHC-Y).

FIG. 10 is a process for implementing stream routing, in accordance with various embodiments. Process 1000 may be implemented using the apparatus, systems, techniques, and processes described herein and in particular with respect to FIGS. 1-9.

At block 1002, the process may include identifying a transaction layer packet (TLP).

At block 1004, the process may further include identifying a Stream ID field within the TLP.

At block 1006, the process may further include routing the packet to a node based upon the Stream ID field within the TLP.

Figure 11:
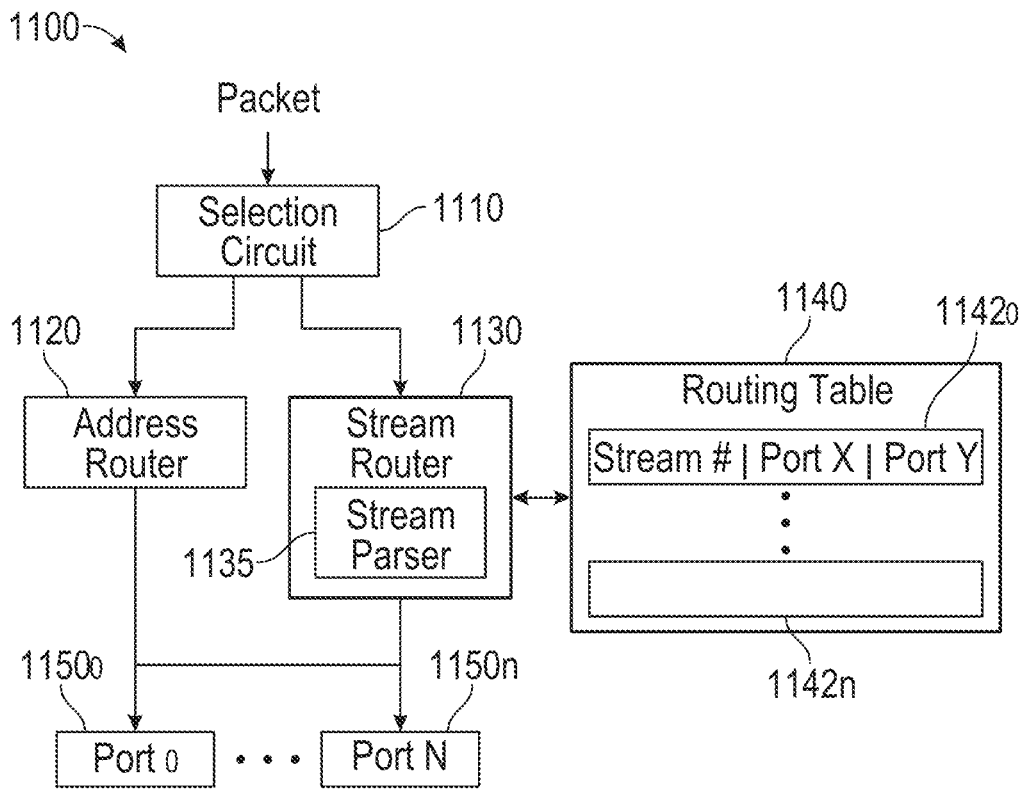
FIG. 11 is a block diagram of a router circuit in accordance with an embodiment.

Referring now to FIG. 11, shown is a block diagram of a router circuit in accordance with an embodiment. Router circuit 1100 may be implemented in a variety of devices that receive and forward packets along a path from a source to a destination. As examples, router circuit 1100 may be implemented in a root complex, switch or multi-function device, among many others.

As shown, router circuit 1100 receives incoming packets in a selection circuit 1110. In different implementations, selection circuit 1110 may include multiplexer or other switching circuitry to direct incoming packets to one of two different routers, namely an address router 1120 or a stream router 1130. Although embodiments are not limited in this regard in one example, selection circuit 1110 may direct an incoming packet to a selected one of address router 1120 or stream router 1130 based at least in part on a type field included in the packet. Of course other mechanisms, including configurable control based on mode of operation or so forth also may control direction of packets.

As illustrated, from selection circuit 1110, packets are directed either to address router 1120 or stream router 1130. Address router 1120 may be configured to route a received packet to a given one of multiple ports $1150_0$-$1150_n$ based on address information within the packet. As such, address router 1120 is configured to perform an address-based routing. In turn, stream router 1130 is configured to perform a stream-based routing to route a received packet to a given one of ports 1150 based on stream information within a packet.

As illustrated, stream router 1130 includes a stream parser 1135 that is configured to parse an incoming packet to obtain stream information to be used for performing stream-based routing. As seen, stream router 1130 couples to at least one routing table 1140. In the embodiment shown, routing table 1140 includes a plurality of entries $1142_0$-$1142_n$. Each entry 1142 may include fields to store stream information, e.g., a stream number or stream identifier and information regarding a pair of ports associated with the stream. Using the stream information parsed from within a packet, stream router 1130 may access port information in a given entry 1142 to identify an appropriate one of ports $1150_0$-$1150_n$ to direct the packet, assuming a valid association of ports for given stream information. Understand while shown at this high level in the embodiment of FIG. 11, many variations and alternatives are possible.

Figure 12:
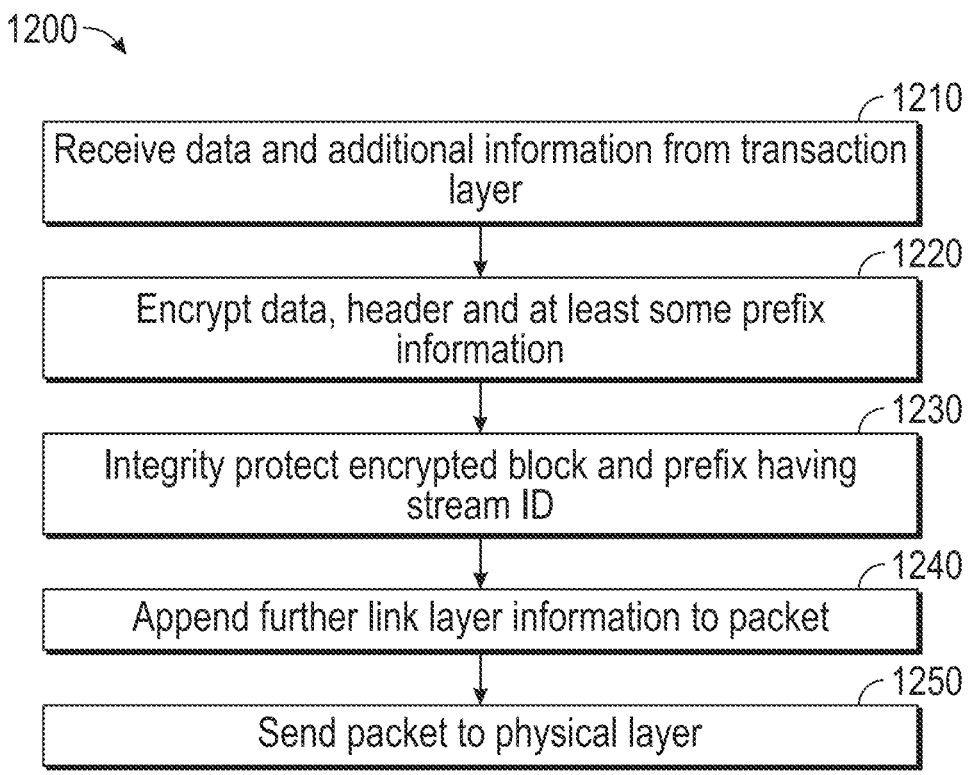
FIG. 12 is a flow diagram of a method in accordance with an embodiment.

Referring now to FIG. 12, shown is a flow diagram of a method in accordance with an embodiment. As shown in FIG. 12, method 1200 is a method for processing transaction layer packets. More specifically, method 1200 shown in FIG. 12 is a method for forming a TLP that includes a combination of encrypted and unencrypted information that may leverage embodiments herein. Method 1200 may be performed by hardware circuitry, firmware, software and/or combinations thereof. In a particular embodiment, method 1200 may be performed within link layer circuitry of a device that generates packets for transmission.

As illustrated, method 1200 begins by receiving data and additional information from a transaction layer (block 1210). Such additional information may include certain header information and additional packet information. Next at block 1220 the data and header may be encrypted, along with at least some prefix information. While many different encryption techniques may be used, some embodiments may implement an AES encryption technique. Note that the prefix information to be encrypted may include end-to-end prefix information. However, other prefix information including stream information is not encrypted.

Next at block 1230 at least a portion of the packet may be integrity protected. In an embodiment, this portion may include the encrypted block and the unencrypted prefix portion that includes the stream identifier. In an embodiment, the integrity protection may be a CRC integrity protection process. Next at block 1240 further link layer information such as sequence number, local prefixes, message authentication code (MAC) information, may be appended to the packet. Finally, at block 1250 the packet, which thus includes an encrypted portion and an unencrypted portion, is sent to a physical layer for transmission. Understand while shown at this high level in the embodiment of FIG. 12, many variations and alternatives are possible.

Figure 13:
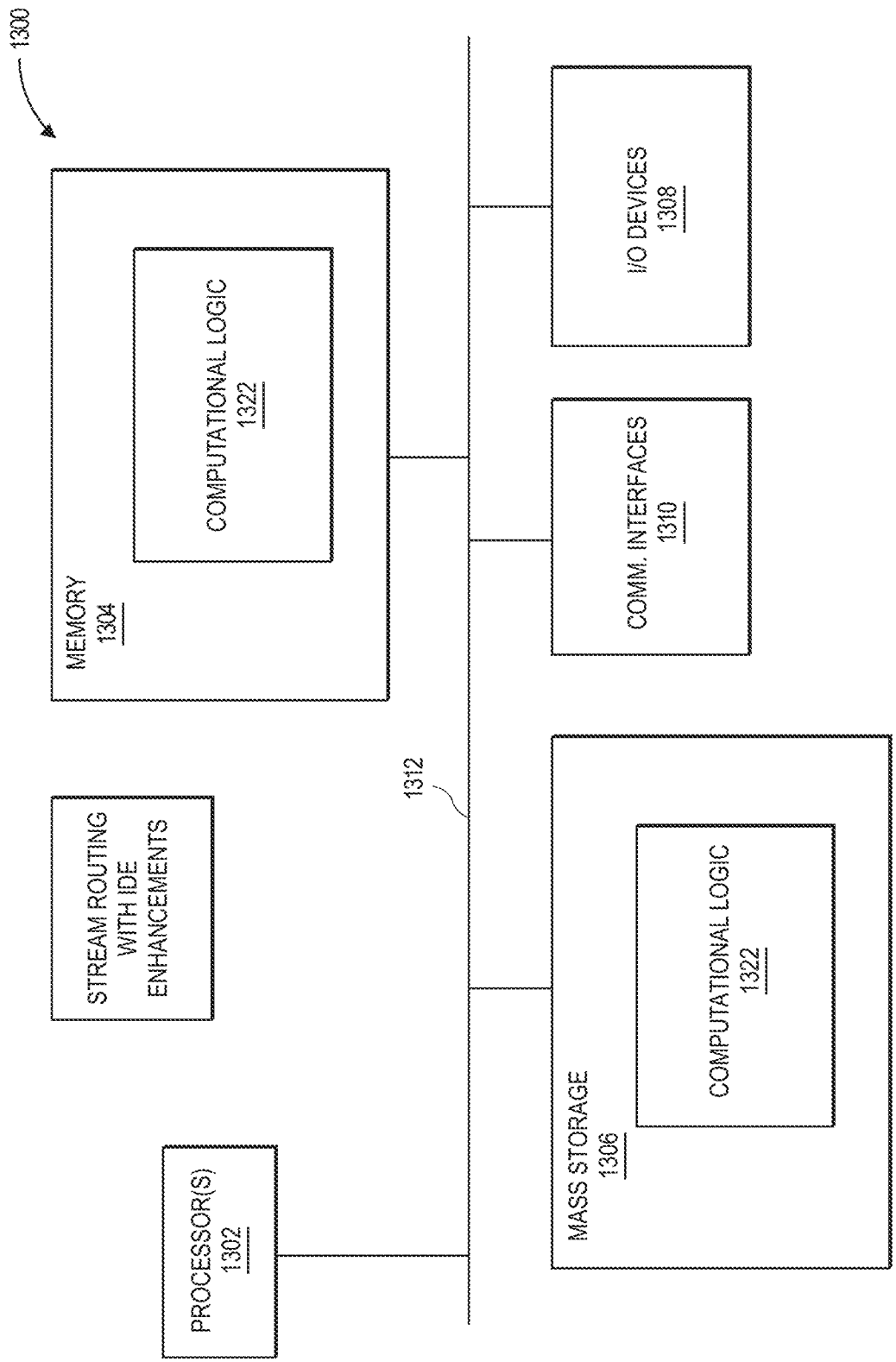
FIG. 13 illustrates an example computing device suitable for having various components of FIGS. 1-12, in accordance with various embodiments.

FIG. 13 illustrates an example computing device 1300 suitable for having various components of FIGS. 1-12, in accordance with various embodiments. As shown, computing device 1300 may include one or more processors or processor cores 1302, system memory 1304, mass storage 1306, communication interfaces 1310 and I/O devices 1308, coupled with each other via one or more buses/interconnects 1312. In embodiments, processors 1302, memory 1304 and/or communication interfaces 1310 may be mounted on a motherboard (not shown). Processors 1302, memory 1304 and/or communication interfaces 1310 may use stream routing with IDE enhancements earlier described with references to FIGS. 1-12.

For the purpose of this application, including the claims, the terms "processor" and "processor cores" may be considered synonymous, unless the context clearly requires otherwise. The processor 1302 may include any type of processors, a microprocessor, and the like. The processor 1302 may be implemented as an integrated circuit having multi-cores, e.g., a multi-core microprocessor.

Mass storage devices 1306 may be one of diskette, hard drive, volatile memory (e.g., dynamic random-access memory (DRAM), compact disc read-only memory (CD-ROM), digital versatile disk (DVD), and so forth. In general, system memory 1304 and/or mass storage devices 1306 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

I/O devices 1308 may be a display (e.g., a touchscreen display)), keyboard, cursor control, remote control, gaming controller, image capture device, a camera, one or more sensors, and so forth and communication interfaces 1310 may include network interface cards, serial buses, modems, infrared receivers, radio receivers (e.g., Bluetooth), and so forth).

The communication interfaces 1310 may include communication chips (not shown) that may be configured to operate the device 1300 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

System buses/Interconnects 1312 may include, for example, PCIe buses. In other words, selected ones of processors 1302, memory 1304, mass storage 1306, communication interfaces 1310 and I/O devices 1308 may be PCIe devices or other serial bus-based devices. In particular, they may be devices incorporated with the teachings of the present disclosure to provide stream routing with IDE enhancements. In the case of multiple buses, they may be bridged by one or more bus bridges (not shown).

Each of these elements may perform its conventional functions known in the art. In particular, system memory 1304 and mass storage devices 1306 may be employed to store a working copy and a permanent copy of the programming instructions for the operation of various components of computing device 1300, including but not limited to an operating system of computing device 1300, one or more applications, and/or system software/firmware in support of practice of the present disclosure, collectively referred to as computing logic 1322. The various elements may be implemented by assembler instructions supported by processor(s) 1302 or high-level languages that may be compiled into such instructions.

The permanent copy of the programming instructions may be placed into mass storage devices 1306 in the factory, or in the field through, for example, a distribution medium (not shown), such as a compact disc (CD), or through communication interface 1310 (from a distribution server (not shown)). That is, one or more distribution media having an implementation of the agent program may be employed to distribute the agent and to program various computing devices.

The number, capability, and/or capacity of the elements 1302, 1304, 1306, 1308, 1310, and 1312 may vary, depending on whether computing device 1300 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, at least one of processors 1302 may be packaged together with computational logic 1322 configured to practice aspects of embodiments described herein to form a System in Package (SiP).

In various implementations, the computing device 1300 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 1300 may be any other electronic device that processes data.

Figure 14:
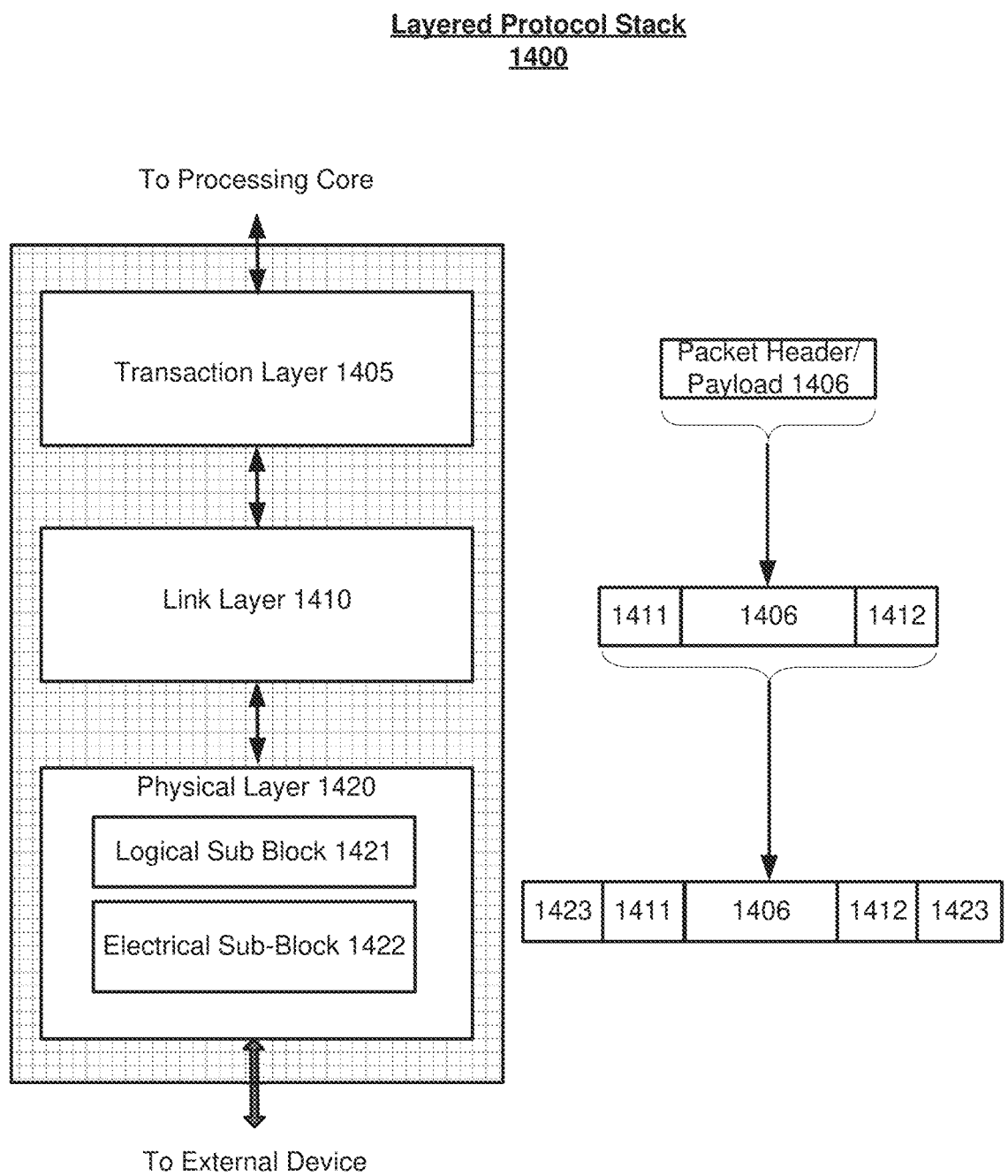
FIG. 14 is an embodiment of a layered protocol stack.

Turning to FIG. 14 an embodiment of a layered protocol stack is illustrated. Layered protocol stack 1400 includes any form of a layered communication stack, such as a PCIe stack, a next generation high performance computing interconnect stack, or other layered stack. Although the discussion herein is in relation to a PCIe stack, the same concepts may be applied to other interconnect stacks. In one embodiment, protocol stack 1400 is a PCIe protocol stack including a transaction layer circuit (transaction layer) 1405, link layer circuit (link layer) 1410, and physical layer circuit (physical layer) 1420. An interface may be represented as communication protocol stack 1400. Representation as a communication protocol stack may also be referred to as a module or interface implementing/including a protocol stack.

PCI Express uses packets to communicate information between components. Packets are formed in the Transaction Layer 1405 and Data Link Layer 1410 to carry the information from the transmitting component to the receiving component. As the transmitted packets flow through the other layers, they are extended with additional information necessary to handle packets at those layers. At the receiving side the reverse process occurs and packets get transformed from their Physical Layer 1420 representation to the Data Link Layer 1410 representation and finally (for Transaction Layer Packets) to the form that can be processed by the Transaction Layer 1405 of the receiving device.

In one embodiment, transaction layer 1405 is to provide an interface between a device's processing core and the interconnect architecture, such as data link layer 1410 and physical layer 1420. In this regard, a primary responsibility of the transaction layer 1405 is the assembly and disassembly of packets (i.e., transaction layer packets, or TLPs). The transaction layer 1405 typically manages credit-based flow control for TLPs. PCIe implements split transactions, i.e., transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1405. An external device at the opposite end of the link, such as controller hub, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In an embodiment, four transaction address spaces include a configuration address space, a memory address space, an input/output address space, and a message address space. Note that with embodiments herein, use of stream-based routing may enable another transaction address space, namely a stream address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents. And stream transactions are used for communicating streams between ports using stream-based routing as described herein.

Therefore, in one embodiment, transaction layer 1405 assembles packet header/payload 1406 that may include stream information as described herein, which can further be assembled in link layer 1410, to enable different packets to leverage address or stream routing (or where a single packet can be routing using both address and stream information in different components of a path between a source port and a destination port. Additional format information for packet headers/payloads may be found in relevant PCIe specifications.

Link layer 1410, also referred to as data link layer 1410, acts as an intermediate stage between transaction layer 1405 and the physical layer 1420. In one embodiment, a responsibility of the data link layer 1410 is providing a reliable mechanism for exchanging TLPs between two components a link. One side of the Data Link Layer 1410 accepts TLPs assembled by the Transaction Layer 1405, applies a packet sequence identifier 1411, i.e., an identification number or packet number, calculates and applies an error detection code, e.g., CRC 1412, and submits the modified TLPs to the Physical Layer 1420 for transmission across a physical to an external device.

In one embodiment, physical layer 1420 includes logical sub block 1421 and electrical sub-block 1422 to physically transmit a packet to an external device. Here, logical sub-block 1421 is responsible for the "digital" functions of Physical Layer 1421. In this regard, the logical sub-block includes a transmit section to prepare outgoing information for transmission by physical sub-block 1422, and a receiver section to identify and prepare received information before passing it to the Link Layer 1410.

Physical block 1422 includes a transmitter and a receiver. The transmitter is supplied by logical sub-block 1421 with symbols, which the transmitter serializes and transmits onto an external device. The receiver is supplied with serialized symbols from an external device and transforms the received signals into a bit-stream. The bit-stream is de-serialized and supplied to logical sub-block 1421. In one embodiment, an 8*b*/10*b* transmission code is employed, where ten-bit symbols are transmitted/received. Here, special symbols are used to frame a packet with frames 1423. In addition, in one example, the receiver may also provide a symbol clock recovered from the incoming serial stream.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following examples pertain to further embodiments.

Example 1 may include an apparatus comprising means to perform one or more elements of a method described in or related to any of examples herein, or any other method or process described herein.

Example 2 may include one or more non-transitory computer-readable media comprising instructions to cause an electronic device, upon execution of the instructions by one or more processors of the electronic device, to perform one or more elements of a method described in or related to any of examples herein, or any other method or process described herein.

Example 3 may include an apparatus comprising logic, modules, or circuitry to perform one or more elements of a method described in or related to any of examples herein, or any other method or process described herein.

Example 4 may include a method, technique, or process as described in or related to any of examples herein, or portions or parts thereof.

Example 5 may include an apparatus comprising: one or more processors and one or more computer readable media comprising instructions that, when executed by the one or more processors, cause the one or more processors to perform the method, techniques, or process as described in or related to any of examples herein, or portions thereof.

Example 6 may include a signal as described in or related to any of examples herein, or portions or parts thereof.

In one example, an apparatus includes: at least one port to interface with a partner port on another device; and a router circuit coupled to the at least one port. The router circuit may include: a first router to route packets based on address information; and a second router to route packets based on stream information. The router circuit may direct a first packet having first stream information to the second router, and the second router is to route the first packet to a target port based at least in part on the stream information.

In an example, the router circuit comprises a selection circuit to route the first packet to the second router based at least in part on type information in a prefix of the first packet.

In an example, the router circuit further comprises a routing table having a plurality of entries, each of the plurality of entries to store stream information and a pair of port identifiers associated with a stream.

In an example, the stream information comprises a programmable stream number for the stream.

In an example, the router circuit further comprises a storage to store a plurality of indicators, each of the plurality of indicators to indicate whether a port is to pass a stream.

In an example, the router circuit is to receive the first packet comprising an IDE packet having an unencrypted portion including the stream information and an encrypted portion including a header having the address information.

In an example, the unencrypted portion comprises an orthogonal header having the stream information.

In an example, in a flit mode, the router circuit is to receive the first packet having an orthogonal header including the stream information, sub-stream information, and a first indicator having a first value to indicate that the packet is integrity protected.

In another example, a system comprises an endpoint and a switch coupled to the endpoint. The endpoint comprises: a first circuit to output data; a transaction layer circuit coupled to the first circuit to receive the data and generate a TLP having the data, a header and a prefix having stream information; and a link layer circuit coupled to the transaction layer circuit to receive the TLP, encrypt at least the data and the header, and send the TLP to a physical layer circuit with an unencrypted portion including the stream information and an encrypted portion including the encrypted data and the encrypted header. The switch comprises: a first port to receive the TLP; a second port; and a router circuit coupled to the first port and the second port, the router circuit to direct the TLP from the first port to the second port based at least in part on the stream information.

In an example, the router circuit comprises: a first router to route TLPs based on address information; and a second router to route TLPs based on stream information; where the router circuit is to direct the TLP to the second router and direct a second TLP not having stream information to the first router.

In an example, the link layer circuit is to integrity protect the encrypted portion and a prefix comprising the stream information.

In an example, in a flit mode, the transaction layer circuit is to generate a second TLP having second data, a second header and an orthogonal header having second stream information.

In an example, in the flit mode, the transaction layer circuit is to generate the second TLP having the orthogonal header further including sub-stream information and a first indicator having a first value to indicate that the second TLP is integrity protected and a second indicator having a second value to indicate that the second TLP does not have a message authentication code.

In an example, the router circuit is to direct the second TLP to a third port of the switch coupled to a port of another endpoint based at least in part on the second stream information.

In yet another example, a method comprises: identifying, in a routing circuit, a TLP; identifying, in the routing circuit, a stream identifier field within the TLP; and routing the packet to a node based at least in part on the stream identifier field within the TLP.

In an example, the method further comprises identifying the stream identifier field within an IDE TLP.

In an example, routing the packet to the node based at least in part on the stream identifier field within the TLP takes precedence over a legacy PCIe TLP routing mechanism.

In an example, the method further comprises encrypting a part of a header of the TLP.

In an example, the part of the header of the TLP includes an address.

In an example, routing the packet further includes routing the packet to a selected one of: a switch, a root complex or a multi-function device.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, an apparatus includes: at least one port to interface with a partner port on another device; and a circuit coupled to the at least one port, where the circuit is to selectively encrypt a portion of a packet having a plurality of fields. At least part of one or more fields of the plurality of fields to be used for packet routing are unencrypted.

In an example, the apparatus further comprises a configuration circuit to configure the circuit for the selective encryption and to communicate with the partner port to enable selective decryption in the partner port.

In an example, the apparatus further comprises a routing circuit to route the packet using the unencrypted part of the one or more fields.

In an example, the circuit is to encrypt a payload field of the packet and a first portion of an address field of the packet.

In an example, the routing circuit is to route the packet using a second portion of the address field of the packet, the second portion of the address field unencrypted Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE-PROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   at least one port to interface with a partner port on another device; and
   a router circuit coupled to the at least one port, the router circuit comprising:
      a first router to route packets based on address information; and
      a second router to route packets based on stream information, the stream information comprising a logical connection between a pair of ports, wherein the stream information includes an unencrypted identifier in a packet prefix in non-FLIT mode and orthogonal header content (OHC) in FLIT mode;
   wherein the router circuit is to direct a first packet having first stream information to the second router and the second router is to route the first packet to a target port based at least in part on the stream information, wherein the first packet includes an integrity and data encryption (IDE) packet having an unencrypted portion comprising the stream information and an encrypted portion comprising a header including the address information.

2. The apparatus of claim 1, wherein the router circuit comprises a selection circuit to route the first packet to the second router based at least in part on type information in a prefix of the first packet.

3. The apparatus of claim 1, wherein the router circuit further comprises a routing table having a plurality of entries, each of the plurality of entries to store stream information and a pair of port identifiers associated with a stream.

4. The apparatus of claim 3, wherein the stream information comprises a programmable stream number for the stream.

5. The apparatus of claim 1, wherein the router circuit further comprises a storage to store a plurality of indicators, each of the plurality of indicators to indicate whether a port is to pass a stream.

6. The apparatus of claim 1, wherein the router circuit is to receive the first packet comprising an integrity and data encryption (IDE) packet having an unencrypted portion including the stream information and an encrypted portion including a header having the address information.

7. The apparatus of claim 6, wherein the unencrypted portion comprises an orthogonal header having the stream information.

8. The apparatus of claim 1, wherein in a flit mode, the router circuit is to receive the first packet having an orthogonal header including the stream information, sub-stream information, and a first indicator having a first value to indicate that the packet is integrity protected.

9. A system comprising:
an endpoint comprising:
a first circuit to output data;
a transaction layer circuit coupled to the first circuit to receive the data and generate a transaction layer packet (TLP) having the data, a header having address information and a prefix having stream information comprising a logical connection between a pair of ports, wherein the stream information includes an unencrypted identifier in a packet prefix in non-FLIT mode and orthogonal header content (OHC) in FLIT mode; and
a link layer circuit coupled to the transaction layer circuit to receive the TLP, wherein the TLP comprises an Integrity and Data Encryption (IDE) packet having an unencrypted portion comprising the stream information and an encrypted portion comprising the header including the address information, and the encrypted data, and to send the TLP to a physical layer circuit; and
a switch coupled to the endpoint, the switch comprising:
a first port to receive the TLP;
a second port; and
a router circuit coupled to the first port and the second port, the router circuit to direct the TLP from the first port to the second port based at least in part on the stream information.

10. The system of claim 9, wherein the router circuit comprises:
a first router to route TLPs based on the address information; and
a second router to route TLPs based on the stream information;
wherein the router circuit is to direct the TLP to the second router and direct a second TLP not having the stream information to the first router.

11. The system of claim 9, wherein the link layer circuit is to integrity protect the encrypted portion and the prefix comprising the stream information.

12. The system of claim 9, wherein in a flit mode, the transaction layer circuit is to generate a second TLP having second data, a second header and an orthogonal header having second stream information.

13. The system of claim 12, wherein in the flit mode, the transaction layer circuit is to generate the second TLP having the orthogonal header further including sub-stream information and a first indicator having a first value to indicate that the second TLP is integrity protected and a second indicator having a second value to indicate that the second TLP does not have a message authentication code.

14. The system of claim 12, wherein the router circuit is to direct the second TLP to a third port of the switch coupled to a port of another endpoint based at least in part on the second stream information.

15. The system of claim 12 wherein the router is to identify the stream information within an integrity and data encryption (IDE) TLP.

16. An apparatus comprising:
at least one port to interface with a partner port on another device;
a circuit coupled to the at least one port, wherein the circuit is to selectively encrypt a payload field of a packet and a first portion of an address field of the packet, wherein the packet is an Integrity and Data Encryption (IDE) packet having an unencrypted portion comprising stream information, wherein the stream information includes an unencrypted identifier in a packet prefix in non-FLIT mode and orthogonal header content (OHC) in FLIT mode, and an encrypted portion comprising the header including the address information and the payload; and
a routing circuit to route the packet using a second portion of the address field of the packet, the second portion of the address field unencrypted.

17. The apparatus of claim 16, further comprising a configuration circuit to configure the circuit for the selective encryption and to communicate with the partner port to enable selective decryption in the partner port.

* * * * *